United States Patent
Ray et al.

(10) Patent No.: US 8,295,827 B2
(45) Date of Patent: Oct. 23, 2012

(54) SYSTEM AND METHOD FOR ESTABLISHING OPTIMAL PARAMETERS FOR PERFORMING SEAMLESS CALL TRANSFER BETWEEN CORDLESS AND WIRELESS MODES

(75) Inventors: Amar Nath Ray, Shawnee, KS (US); Cadathur V. Chakravarthy, Overland Park, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 998 days.

(21) Appl. No.: 12/004,966

(22) Filed: Dec. 20, 2007

(65) Prior Publication Data

US 2009/0163198 A1    Jun. 25, 2009

(51) Int. Cl.
*H04W 4/00* (2009.01)
(52) U.S. Cl. ............ 455/426.1; 455/423; 455/421; 455/552.1; 455/436; 370/331
(58) Field of Classification Search ............ 455/426.1, 455/436–444, 66.1, 67.11, 67.12, 67.13, 455/67.14, 67.15, 62, 63.3, 513, 552.1, 168.1, 455/188.1, 67.7, 74.1; 370/331
See application file for complete search history.

(56) References Cited

U.S. PATENT DOCUMENTS

| | | | | |
|---|---|---|---|---|
| 5,406,615 A | * | 4/1995 | Miller et al. | 455/552.1 |
| 5,463,673 A | * | 10/1995 | Herscovici | 455/446 |
| 5,533,099 A | * | 7/1996 | Byrne | 455/552.1 |
| 5,594,782 A | * | 1/1997 | Zicker et al. | 455/417 |
| 5,659,598 A | * | 8/1997 | Byrne et al. | 455/436 |
| 5,737,703 A | * | 4/1998 | Byrne | 455/442 |
| 5,805,667 A | * | 9/1998 | Alvarez et al. | 379/1.01 |
| 5,822,693 A | * | 10/1998 | Harrison | 455/432.1 |
| 5,930,712 A | * | 7/1999 | Byrne et al. | 455/437 |
| 5,960,335 A | * | 9/1999 | Umemoto et al. | 455/226.2 |
| 6,115,608 A | * | 9/2000 | Duran et al. | 455/436 |
| 6,253,088 B1 | * | 6/2001 | Wenk et al. | 455/462 |
| 6,397,075 B1 | * | 5/2002 | Sastrodjojo et al. | 455/515 |
| 6,421,538 B1 | * | 7/2002 | Byrne | 455/441 |
| 6,453,156 B1 | * | 9/2002 | Center et al. | 455/161.3 |
| 6,487,410 B1 | * | 11/2002 | Kontio et al. | 455/437 |
| 6,681,118 B2 | * | 1/2004 | Raffel et al. | 455/552.1 |
| 6,708,028 B1 | * | 3/2004 | Byrne | 455/426.1 |

(Continued)

OTHER PUBLICATIONS

PN-3-4350-RV3-Cordless Telephone Range Measurement Procedures,Telecommunications Industry Association-TIA/EIA Aug. 2002 ( part of TIA/EIA-470-C.310).*

*Primary Examiner* — Jinsong Hu
*Assistant Examiner* — Magdi Elhag
(74) *Attorney, Agent, or Firm* — Patton Boggs LLP

(57) ABSTRACT

A system and method for establishing a signal parameter threshold for switching between communications protocols by a multimode handset may include providing cordless telephones of different models. A dropout point at which a communications signal of each of the cordless telephones deteriorates below a predetermined level may be determined. At least one signal parameter of the communications signal at the determined dropout point of each of the cordless telephones may be measured and collected. The signal parameter (s) associated with the cordless telephone having the shortest range at which the associated dropout point may be determined so that a multimode handset may be established with the signal parameter(s) to cause the multimode handset to switch communications protocols in response to the multimode handset crossing a signal parameter threshold level defined by the predetermined signal parameter(s) when communicating with a base unit of a cordless telephone.

16 Claims, 11 Drawing Sheets

U.S. PATENT DOCUMENTS

| | | | |
|---|---|---|---|
| 7,058,415 B2 * | 6/2006 | Bushnell et al. | 455/461 |
| 7,610,047 B2 * | 10/2009 | Hicks et al. | 455/433 |
| 7,627,338 B2 * | 12/2009 | Hicks et al. | 455/552.1 |
| 7,646,777 B2 | 1/2010 | Hicks et al. | 370/401 |
| 7,664,492 B1 * | 2/2010 | Lee et al. | 455/424 |
| 2001/0031625 A1 * | 10/2001 | Lynn | 455/67.1 |
| 2003/0069014 A1 * | 4/2003 | Raffel et al. | 455/426 |
| 2003/0129948 A1 * | 7/2003 | Gab et al. | 455/67.1 |
| 2004/0259541 A1 * | 12/2004 | Hicks et al. | 455/426.1 |
| 2006/0148480 A1 * | 7/2006 | Thorson et al. | 455/442 |
| 2007/0191013 A1 * | 8/2007 | Gunnarsson et al. | 455/438 |
| 2008/0085746 A1 * | 4/2008 | Ray et al. | 455/575.1 |
| 2008/0148080 A1 * | 6/2008 | Ma | 713/320 |
| 2009/0023442 A1 * | 1/2009 | Ahmed et al. | 455/426.2 |

* cited by examiner

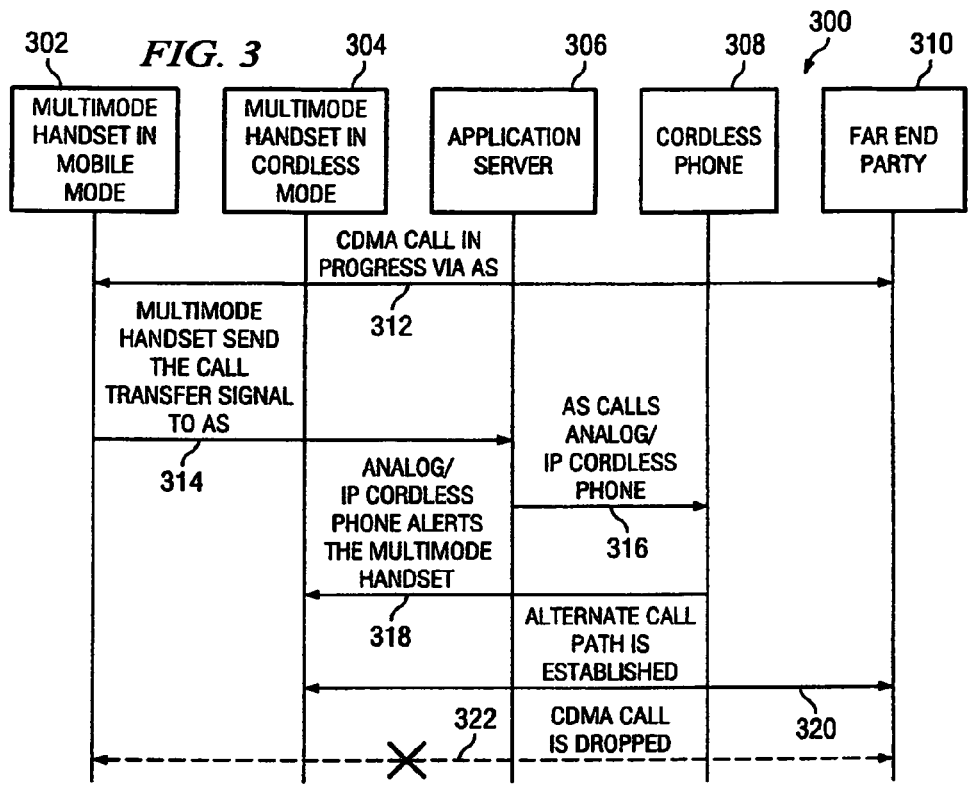
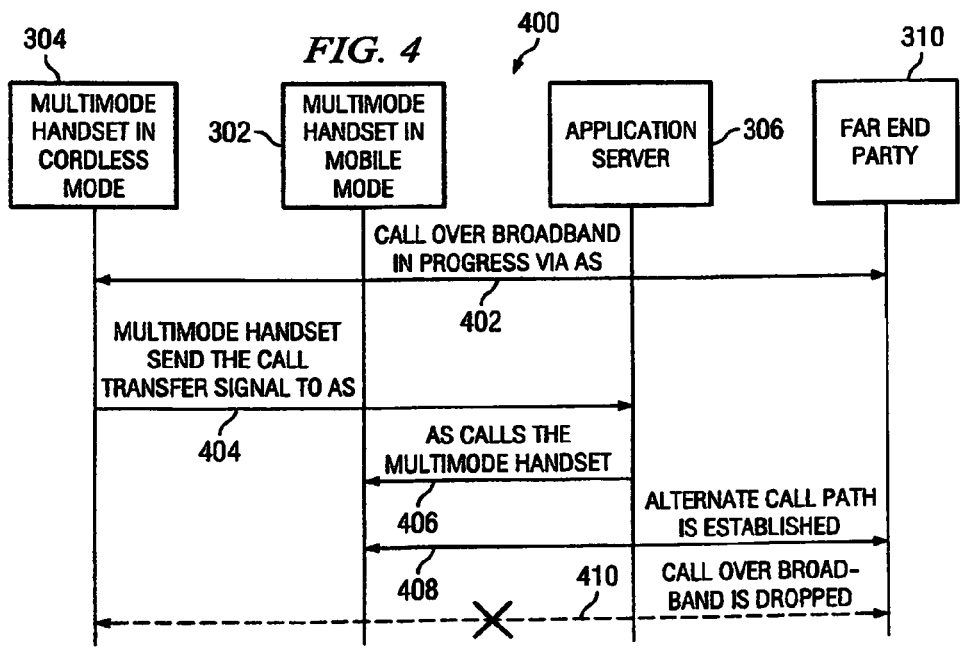

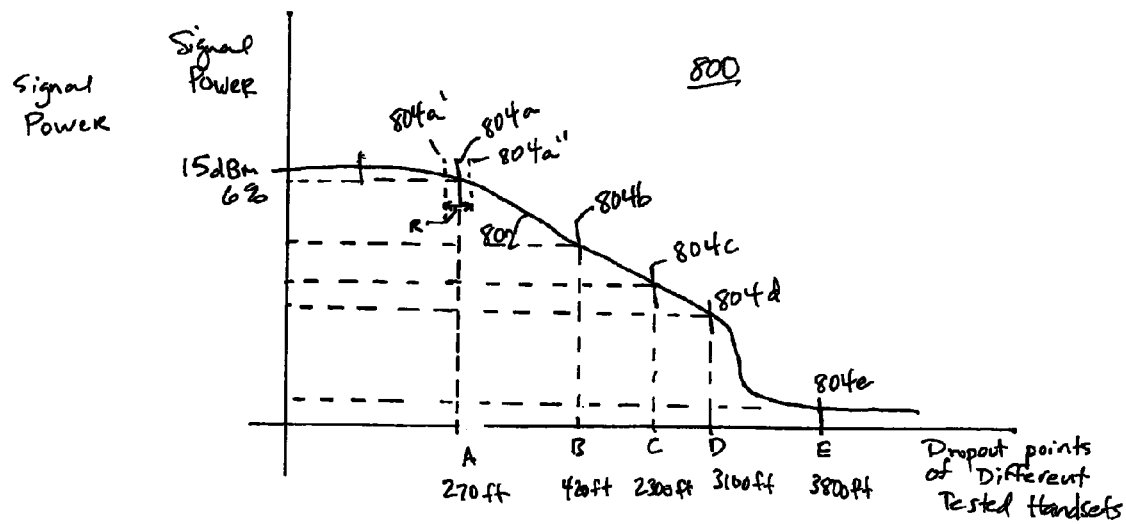
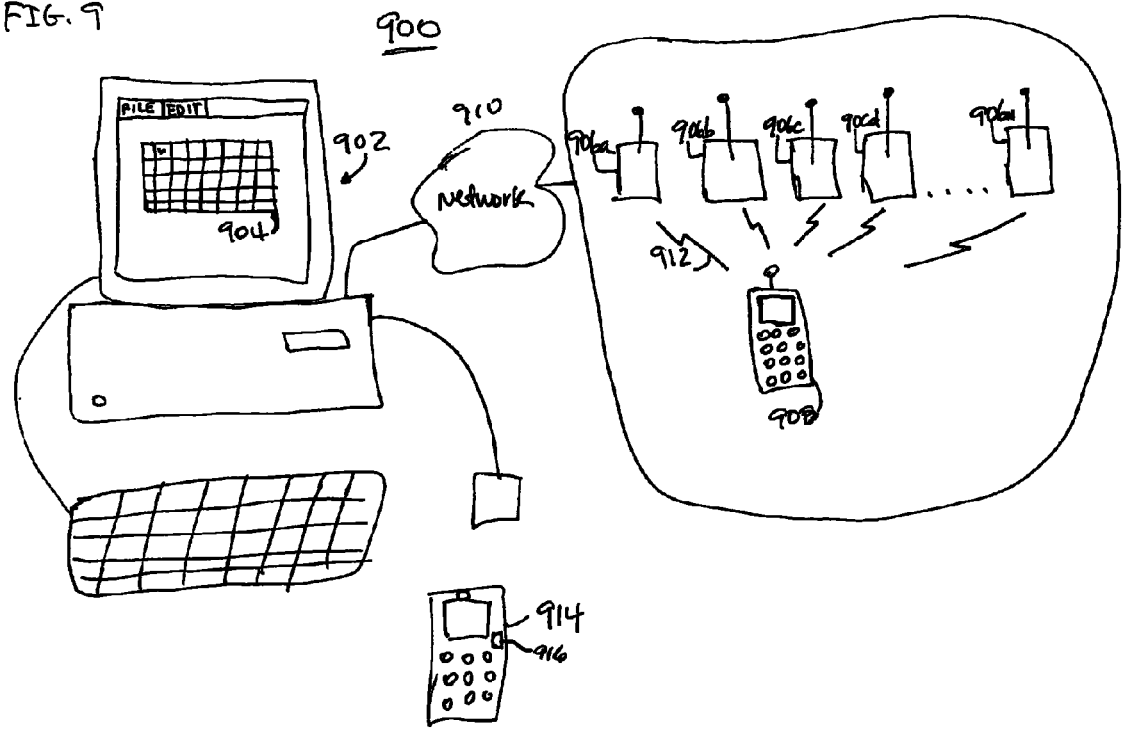

SYSTEM AND METHOD FOR ESTABLISHING OPTIMAL PARAMETERS FOR PERFORMING SEAMLESS CALL TRANSFER BETWEEN CORDLESS AND WIRELESS MODES

BACKGROUND

The telecommunications industry has evolved greatly over the past 30 years. Telecommunications developed from service providers delivering analog telephone services to homes and businesses. The analog telephone services initially limited telephones to be connected directly to telephone wires. These telephones had a base unit and a handset connected to the base unit via a cord. Cordless telephones were later developed to allow users to talk on the telephone while moving freely about his or her house or in the local vicinity. The cordless telephone is basically a combination of a telephone and a radio transmitter/receiver and has two components, a base and a handset. The base is attached to the public switched telephone network via a wire connection. The base receives an incoming call from the public switched telephone network and converts it to an FM signal, which is locally broadcast. The handset also includes a receiver/transmitter to receive the FM radio signals from the base, convert the radio signals to sound for the user of the handset to hear the other person's speech and broadcast speech spoken into the handset by the user back to the base for communication back to the other person via the public switch telephone network.

Initially, around 1980, the FM signals were broadcast at a frequency of 27 megahertz (MHz). In 1986, the frequency range was increased by the Federal Communications Commission (FCC) to be between 47 and 49 MHz. These early cordless wireless telephones had problems, such as limited range, poor sound quality, and poor security. In 1990, the FCC granted a frequency range of 900 MHz, which increased the range and clarity of the signals due to having more channels within the range. In 1994, digital cordless phones were introduced, which improved the sound quality and increased security. In 1995, Digital Spread Spectrum (DSS) was introduced for cordless telephones. DSS greatly improved security to prevent eavesdropping of telephone calls. In 1998, the frequency range of cordless telephones was increased by the FCC to 2.4 and 5.8 gigahertz (GHz). As understood in the art, these different communication techniques (i.e., analog and digital) are known as local, cordless telephone communications protocols.

There are currently 110 million households in the United States. At present, 48 million households have broadband communications delivered by service providers. Broadband communications enable high speed Internet access, but also enable digital cordless telephone capabilities, including voice over IP (VoIP).

While cordless telephones made great strides over the years, mobile telephones or cell phones were also developing during that time period. Initially, analog cell phone communications were developed. One standard was known as advanced mobile phone service (AMPS). Over time, digital mobile communications were developed. These digital communications included a number of different mobile communications protocols, including Time Division Multiple Access (TDMA), Code Division Multiple Access (CDMA), and Global System for Mobile Communications (GSM). For the most part, TDMA and CDMA have been adopted in the United States while GSM is more heavily utilized in Europe. Because of the different standards, handset makers adopted mobile handsets or telephones for the particular mobile communications protocols. To accommodate service providers and customers, handset makers eventually adopted handsets to be able to communicate over multiple mobile protocols. For example, mobile telephones are now widely available to communicate over the AMPS, CDMA, and GSM mobile communications protocols. These tri-mode telephones enable subscribers to roam in various areas of the United States and Europe and communicate over different telecommunications networks using the different wireless communications protocols.

More recently, wireless fidelity (WiFi) communications have been developed to enable computers to communicate over the Internet via WiFi access points. These WiFi access points were originally deployed in public venues, such as coffee shops, airports, and other locations to enable customers of those locations to communicate over the Internet with their computers. One reason for public deployment is the cost of the WiFi access points. More recently, WiFi access points have come down in price and are now being deployed in houses to enable computer users to access the Internet wirelessly from their computers, thereby eliminating the need to have a computer connected to a cable within a house. Although less expensive, the WiFi access points are still relatively expensive so that, relatively speaking, few homes have WiFi access points.

With this new form of wireless communication, handset makers have begun developing telephones that are capable of communicating over WiFi access points. Some of the handsets are limited to WiFi communications, but other handsets have begun integrating mobile telephone communications (e.g., CDMA and WiFi communications). There are a number of problems with WiFi. First, the handsets are expensive. Another problem that exists with WiFi telephone communications is that the WiFi voice quality is well below that of other forms of wireless communications. Studies have shown that PSTN communications and, more recently, VoIP communications receive about a 4.5 or 4.6 mean opinion score (MOS) out of a maximum 5.0 score, mobile telephone CDMA communications receive about a 3.5 or lower MOS, and WiFi communications receive about a 3.0-3.5 MOS. These phones that have been developed seek to benefit subscribers or users of these WiFi compatible handsets by public availability (e.g., coffee shops) and that the technology currently exists. While a cost savings may occur from the mobile communications service provider due to being able to switch to a WiFi communications network, WiFi communications still cost money to access, although a lower monthly-fixed fee than mobile communications. Another problem that exists with WiFi is security, as WiFi is generally an open protocol that enables others with scanners to be able to listen to telephone calls made over unprotected WiFi connections. If a user desires to use WiFi at home, a costly set top box and WiFi access point is needed.

One problem that may be encountered by cordless phones occurs when the cordless phone is located near the edge of the cordless telephone's signal range. TIA/EIA-470-C is a standards document that describes recommended cordless telephone range measurement procedures. Through use of these procedures, ranges of cordless telephones can be determined. Even with these standards defined procedures, practically speaking, not all cordless telephones perform to meet the specifications due to a variety of reasons, such as environmental (e.g., position of base unit with respect to other objects) or cordless phone operations (e.g., low battery). Also, different cordless telephones, even different models produced by the same manufacturer, are often found to have different ranges.

Another common issue with wireless devices involves battery life. For multimode wireless devices, when one communication protocol is being used, features that are not needed from another protocol, such as a signal level boost used for cellular telephones, will remain operable even though the phone is no longer using that protocol. This shortens the time the handset can be used between charges and causes unnecessary energy consumption.

SUMMARY

To overcome the problem of imprecise parameters that indicate to a multimode handset when to switch between communications protocols, the principles of the present invention provide for a system and method for determining the optimal time to switch between communications protocols. Because of variations in cordless base unit ranges, the determination for the optimal time to switch between communications protocols may be based on threshold testing of different cordless telephones, including different cordless telephone models.

One embodiment of a method of establishing a signal parameter threshold to switch between communications protocol by a multimode handset may include providing cordless telephones of different models. The dropout point at which a communications signal of each of the cordless telephones deteriorates below a predetermined level may then be determined. At least one signal parameter of the communications signal at the determined dropout point of each of the cordless telephones may then be measured. The measured signal parameters of the cordless telephones may then be collected. The signal parameter associated with the cordless telephone having the shortest range dropout point may be determined. The determined signal parameter associated with the cordless phone having the shortest range dropout point may be established in a multimode handset to cause the multimode handset to switch communications protocol when the multimode handset crosses a signal parameter threshold level defined by the determined signal parameter when communicating with a base unit of a cordless telephone.

One embodiment may include a system for testing cordless telephones to determine a signal strength threshold to switch between communications protocol by a multimode handset. This system may include multiple cordless telephones for use in determining the shortest communication range of the cordless telephones. A wireless test unit may be configured to communicate with each of the cordless telephones to measure at least one signal parameter of a test communications signal being communicated with each of the cordless telephones. The wireless test unit may additionally be configured to determine when each test communications signal drops below a threshold level. A collection component may be configured to collect the signal parameters measured by the wireless test unit. The system may also include an initialization component configured to initialize a multimode handset with a signal parameter threshold level determined from the signal parameters collected by the collection component. The initialized signal parameter threshold level may be used to cause the multimode handset to switch communications protocols in response to the multimode handset having an operating communications signal crossing the signal parameter threshold level when communicating with a base unit of a cordless telephone.

BRIEF DESCRIPTION OF THE DRAWINGS

Illustrative embodiments of the present invention are described in detail below with reference to the attached drawing figures, which are incorporated by reference herein and wherein:

FIG. 3 is a call flow diagram illustrating exemplary call switching from a mobile telephone communications protocol and a cordless telephone communications protocol;

FIG. 4 is an illustration of an exemplary call flow diagram illustrating a telephone call switching from a cordless telephone communications protocol and mobile telephone communications protocol;

FIG. 8 is a graphical depiction of dropout points of different tested cordless telephones;

FIG. 9 is an illustration of an exemplary environment for testing cordless telephones to determine a signal strength threshold for use in a multimode handset.

DETAILED DESCRIPTION OF THE DRAWINGS

Figure 1A:
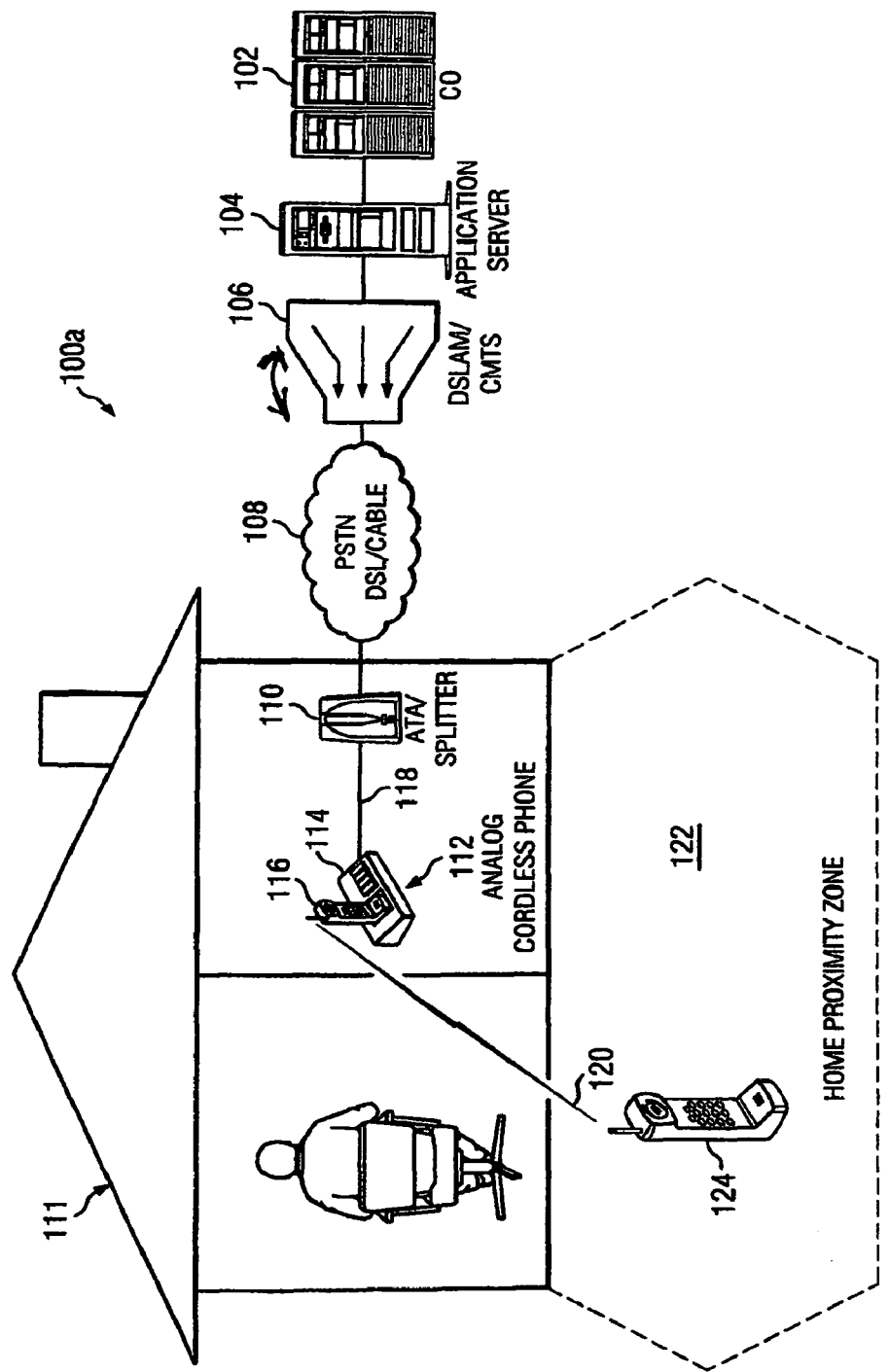
FIG. 1A is an illustration of an exemplary network for analog cordless telephone and multimode handset services via a broadband communications network within a home.

FIG. 1A is an illustration of an exemplary network 100a for analog cordless telephone services within a home. The network 100a may include a central office 102 of a service provider in communication with an application server 104. The application server may be in communication with a digital subscriber line access multiplexer (DSLAM) and/or cable modem termination system (CMTS) 106. The DSLAM/CMTS 106 may operate to link many customers with DSL/Cable connections to a single high-speed asynchronous transfer mode (ATM) line. The DSLAM operates to detect voice and data signals and direct the voice signals over the public switched telephone network (PSTN) and data signals to the Internet. The CMTS 106 enables cable television operators to offer high-speed Internet access to home computers and sends and receives digital cable modem signals over a cable network. The CMTS 106 further receives signals sent upstream from a user's cable modem and converts the signals into IP packets for routing to the Internet. As understood in the art, a DSLAM and CMTS provide many of the same functions and may be used by the same or different service providers in providing analog cordless telephone services and also IP cordless telephone services (FIG. 1B).

Continuing with FIG. 1, a communications network 108 may include the public switched telephone network for providing digital subscriber lines and/or a cable network. An analog terminal adapter (ATA) and/or splitter 110 may be located in a subscriber's home 111 and in communication with the network 108 to receive communications signals (not shown) from the DSLAM/CMTS 106. An analog cordless telephone 112 that includes a base unit 114 and handset 116 may be in communication with the ATA/splitter 110. The analog cordless telephone may receive communications signals 118 from the ATA/splitter 110. As understood in the art, the base unit 114 may communicate the analog communications signals 118 to the handset 116 via an FM broadcast signal 120 anywhere within a home proximity zone 122.

A multimode handset 124 may be configured with two or more communications channels to communicate using a mobile telephone communications protocol and analog cordless telephone protocol. The multimode handset 124 may, too, communicate with the base unit 114 via the FM broadcast signal 120. A more detailed description of a multimode handset is provided with regard to FIG. 2. Although described as a multimode handset, it should be understood that the handset may be a mobile telephone having the capability to communicate with a cordless telephone base unit, as further described herein.

Figure 1B:
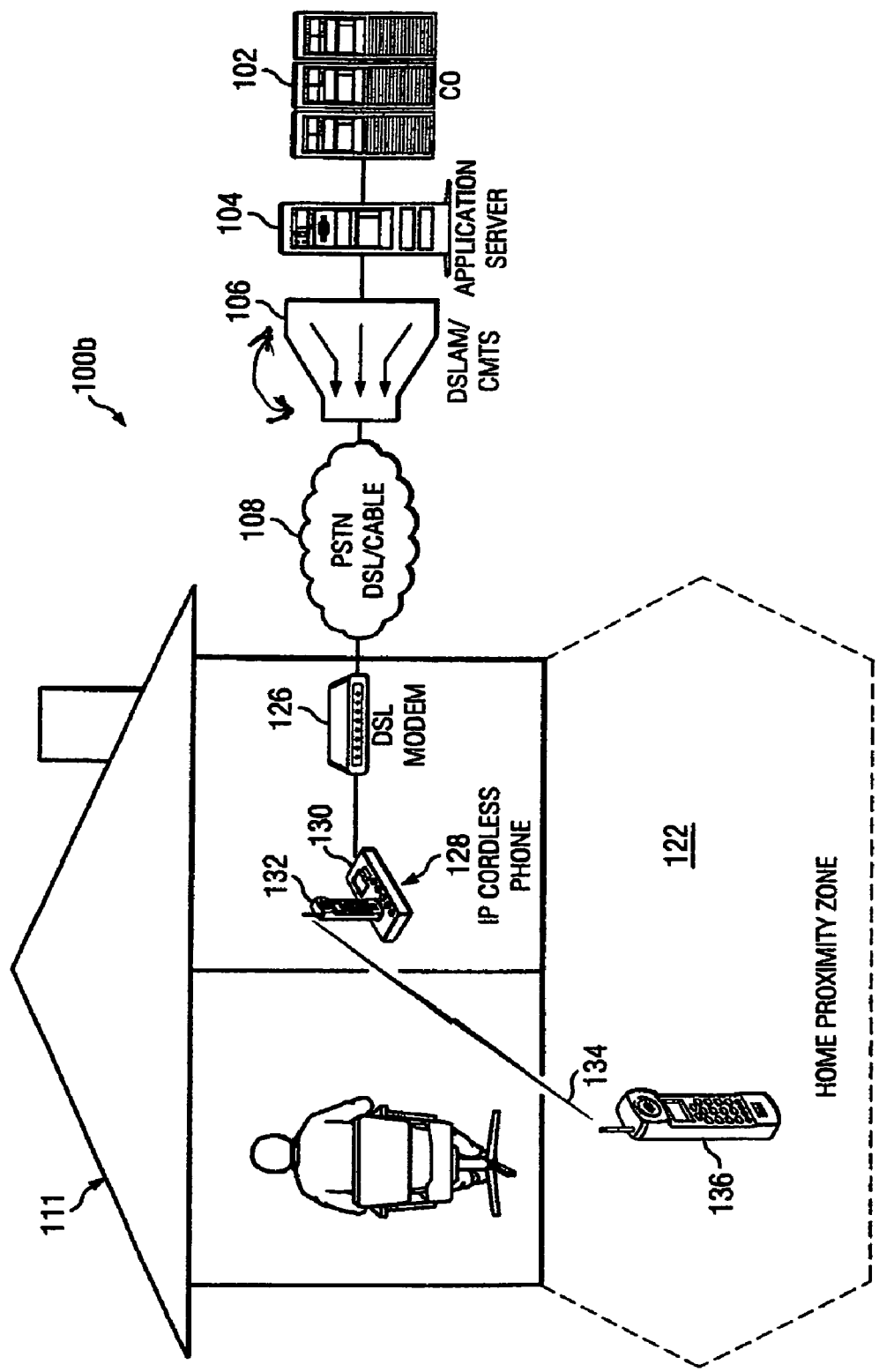
FIG. 1B is an illustration of an exemplary network for Internet protocol cordless telephone and multimode handset services via a broadband telephone network within a home.

FIG. 1B is an illustration of an exemplary network 100b for Internet protocol (IP) cordless telephone services within a home. The network 100b includes the central office 102 in communication with the application server 104. The DSLAM/CMTS 106 may be in communication with the application server and further configured to communicate over the PSTN/cable network 108. In one embodiment, a DSL protocol is communicated from the DSLAM 106 via the PSTN. A DSL modem 126 may be in communication with the network 108. An IP cordless telephone 128 may include a base unit 130 that communicates with the DSL modem 126 and IP cordless handset 132. The IP cordless handset 132 may be a multimode handset that communicates using one or more mobile telephone communications protocols (e.g., CDMA, TDMA, GSM) and a cordless telephone communications protocol (e.g., analog or IP). The wireless handset 133 may communicate with the base unit 130 via RF signals or any other wireless signals within the home proximity zone 122, as understood in the art. In many cases, service providers bundle DSL and telephone services, so telephone calls over a DSL line may likely be free if the subscriber has purchased a bundled service.

Multimode handset 136 may be configured to communicate using an IP cordless telephone protocol. However, when the multimode handset 136 exits the home proximity zone 122, the wireless handset 136 is no longer within range of the base unit 130 and switches to the mobile telephone communications protocol (e.g., CDMA protocol), as further described herein with regard to FIGS. 3 and 4, for example.

Figure 2:
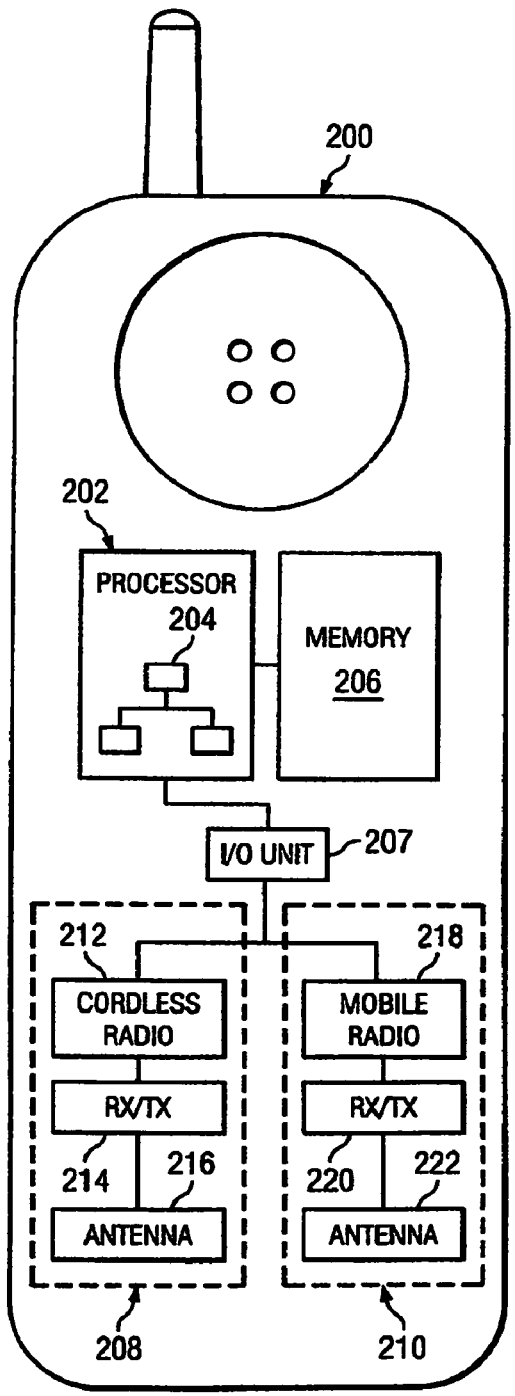
FIG. 2 is a block diagram of a multimode handset configured to communicate using a mobile and cordless telephone modes.

FIG. 2 is a block diagram of an exemplary multimode handset 200. The multimode handset 200 may include a processor 202 that executes software 204. The processor may be in communication with memory 206 and input/output (I/O) unit 207. The I/O unit may be in communication with two or more communications paths 208 and 210. For example, as shown, communications paths 208 and 210 represent a cordless communications path 208 and mobile communication path 210 for communicating over a cordless telephone network (e.g., PSTN) and mobile telephone network, respectively. The cordless communications path 208 may include a cordless radio 212, receiver/transmitter (RX/TX) 214, and antenna 216. The mobile communications path 210 may include a mobile radio 218, RX/TX 220, and antenna 222. It should be understood that if the cordless and mobile telephone are capable of communicating over both communications channels using the same devices along a single communications path, then the multimode handset 200 may utilize a single communications path. However, as understood in the art, the cordless and mobile communications signals are communicated using different protocols so that different communications paths are generally utilized within the multimode handset 200. It should also be understood that if one or more components of each of the communications paths may be utilized for communicating over the cordless and mobile communications channels, that the number of separate components may be reduced. It should also be understood that each communications path within the multimode handset 200 may communicate over a different communications network or path. Because cordless communications is a mature technology, the additional cost to include the cordless communications path in the multimode handset is minimal (e.g., $20 or less).

The software 204 executed on the processor 202 may be utilized to perform a number of functions for the multimode handset 200. For example, the software 204 may be utilized to perform conventional telephone functionality, such as storing names and telephone numbers in the memory 206, managing a calendar, setting alarms, and so forth. In addition, the software 204 may be utilized to determine strength of a signal received from the base unit of a cordless telephone. In one embodiment, the software 204 may have a threshold stored in the memory 206 that the software compares the signal being received from the base unit to determine whether the multimode handset 200 is within range of the base unit. If the software 204 determines that the signal received from the base unit has a signal strength above the threshold, then the software 204 may generate and communicate a call transfer signal to the base unit, which further communicates the call transfer signal to an application server. In other words, the software 204 being executed by the processor 202 may be configured to assist in managing the multimode handset 200 communicating via the cordless communications path 208 or the mobile communications path 210 using a cordless or mobile telephone communications protocol, respectively. The multimode handset may establish communications 200 with a base unit by utilizing a well established registration process. As understood in the art, the multimode handset 200 may register with the base unit of an existing cordless telephone in a similar manner as a cordless telephone with multiple handsets. In one embodiment, a customer may purchase a cordless telephone that comes with a pre-registered multimode handset or handsets.

FIG. 3 is an exemplary call flow diagram illustrating a call switching between a mobile telephone communications protocol (e.g., CDMA) and a cordless telephone communications protocol (e.g., analog or IP). As shown, there are five different communications points between which a call flow occurs. These communication points include a multimode (MMM) handset in mobile mode 302, multimode handset in cordless mode 304, application server 306, cordless phone (e.g., analog or IP) 308, and far end party 310. As shown, the multimode handset in mobile mode 302 has a current call in process via the application server 306 with the far end party 310 at step 312. In one embodiment, the mobile mode uses a CDMA protocol. While in step 312, the multimode handset may determine a signal strength from a base unit of a local, cordless base unit in either an analog or IP communications protocol to determine a signal strength with the base unit. If the multimode handset determines that the signal strength with the cordless base unit is above a signal strength threshold, then at 314, the multimode handset sends a call transfer signal to the application server 306. At step 316, the application server 306 calls the cordless phone 308 (i.e., base unit with which the multimode handset is configured to communicate). Although the call is placed to the analog/IP cordless phone 308, the phone does not ring because the multimode handset may detect the ring signal within 10 milliseconds and a maximum of 25 milliseconds to go off-hook. In other words, the multimode handset can pick-up the call before the cordless base unit is able to ring.

At step 318, the base unit of the cordless phone 308 communicates with the multimode handset in cordless mode 304. This communication enables the multimode handset in cordless mode 304 to answer the call and switch from a mobile telephone communications path (e.g., cellular network) to a cordless telephone communications path so that an alternative call path (e.g., PSTN) is established at step 320 between the far end party and the multimode handset. Once the alternative call path is established, the CDMA call between the multimode handset operating in mobile mode 304 and far end party 310 is dropped by the application server. It should be understood that the multimode handset may operate in conjunction with the application server 306 to perform the switch from the mobile mode to the cordless mode. During that switchover, the application server operates to determine the on-hook and off-hook status of the cordless telephone 308. If the cordless telephone is off-hook when the multimode handset comes into range with the base unit of the cordless telephone, the application server may not place the call to the cordless telephone 308.

In the event of a telephone call being placed to the telephone number of the cordless phone 308 while the multimode handset is in cordless mode 304, the application server may handle call waiting as understood in the art. It should be understood that the base unit of the cordless telephone functions to communicate signals with the cordless handset and multimode handset and security with both handsets may be maintained using a variety of secure communication techniques as understood in the art.

FIG. 4 is an illustration of an exemplary call flow diagram 400 illustrating a telephone call switching between a cordless telephone communications protocol and mobile telephone communications protocol. The process starts at step 402 where a call between the multimode handset in cordless mode 304 is in progress with the far end party 310. While the call is in progress, the user may leave the house, thereby extending beyond the range of the base unit of the cordless phone. The multimode handset may determine that the signal strength with the base unit drops below a threshold signal strength (e.g., −60 dBm) and send a call transfer signal to the application server at step 404. At step 406, the application server calls the multimode handset in mobile mode 302 to establish a new connection via a mobile communications path. It should be understood that the cordless telephone call connection and mobile telephone call connection may be via the same or different service providers, but that the application server 306 may be configured to communicate with both service providers' systems to manage communications for the multimode handset. At step 408, an alternative call path is established for the multimode handset in mobile mode 302. It should be understood that if the multimode handset uses a different mobile telephone protocol, that the alternative mobile communications protocol may be utilized to establish the alternative call path. After the alternative call path is established at step 408, the application server may drop the call between the far end party and the multimode handset in cordless mode 304 at step 410.

Figure 5:
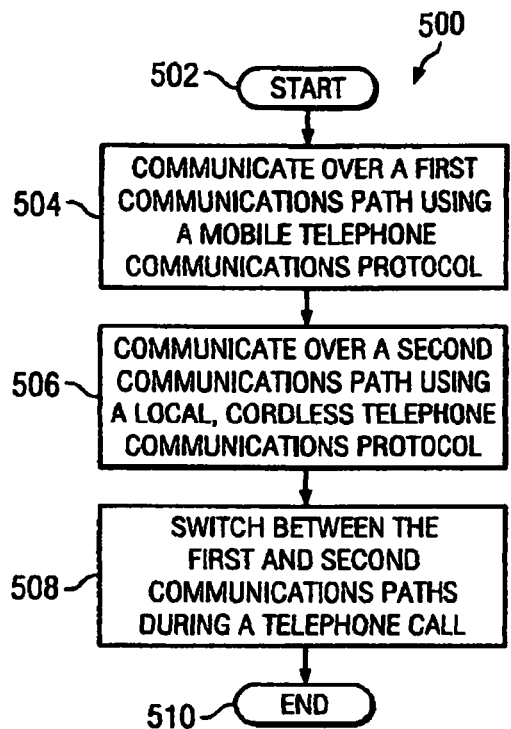
FIG. 5 is a block diagram of an exemplary process for a multimode handset switching between mobile and cordless telephone communications protocols.

FIG. 5 is a block diagram of an exemplary process 500 for a multimode handset switching between mobile and cordless telephone communications protocols. The process 500 starts at step 502. At step 504, a multimode handset may be communicating over a first communications path at the telephone using a mobile telephone communications protocol. In addition, the multimode handset may be communicating over a second communications path at the telephone using a local, cordless telephone communications protocol at step 506. In communicating over the first and second communications path, the multimode handset may be conducting a telephone call on one of the communications paths while "listening" to the other communications path to measure signal strength over the communications path that is currently not being used for the telephone call. At step 508, the multimode handset may switch between the first and second communications paths during the telephone call. In switching between the first and second communications paths, the multimode handset may use devices within the multimode handset that are configured to communicate over a different wireless path, such as a local, cordless telephone communications path that uses an analog or IP protocol, for example. The process ends at step 510.

Although not shown, as described with regard to FIGS. 3 and 4, the multimode handset may measure signal strength of a signal being communicated using the local, cordless telephone communications protocol. In response to determining that the signal is above a signal strength threshold, the multimode handset may communicate a call transfer signal (e.g., "*7") to an application server to switch the telephone call from the first to the second communications path. In response to receiving a telephone call via the communications path over which the telephone call is not being conducted, the multimode handset may switch to answer the telephone call, which is a continuation of the telephone call being conducted on the other communications. The switch may occur within 600 milliseconds (ms) to minimize the ability for a user to detect that the call switched between the first and second communications paths. The 600 ms switchover results from (i) 20 ms for detecting the cordless signal strength, (ii) 50 ms for the cell switch or call forwarding signal to be sent from the multimode handset to the application server, (iii) 200 ms for the application server to set up the second call path, (iv) 130 ms for the multimode handset to receive the new call, and (v) 200 ms for the application server to disconnect the old connection and start and stop billing management. The multimode handset may provide an indicator to notify a user of a mode switch. For example, the multimode handset may display a light using a light emitting diode, display a message on a display, produce a tone or other sound, vibrate, or provide any other indicator or a combination of indicators to alert the user that the multimode handset has switched or is currently operating over one or the other communications paths. In one embodiment, the multimode handset may include a light to produce one color while communicating using a mobile communications protocol and another color using a cordless communications protocol. The I/O unit 207 of FIG. 2 may generate the indication through use of an external display or light (not shown) or through the use of a speaker built into the multimode handset.

Figure 6:
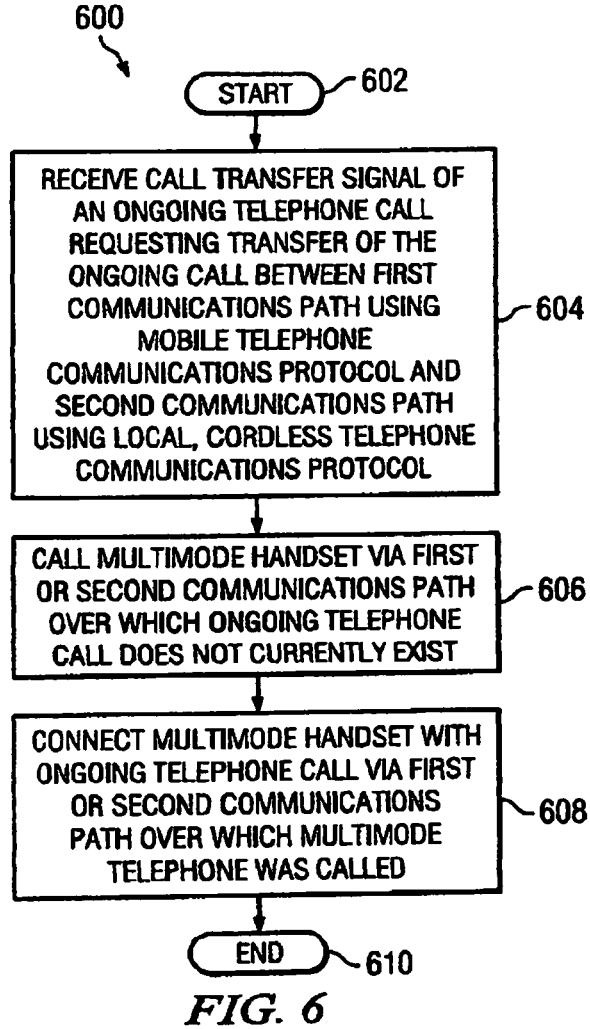
FIG. 6 is a flow diagram of an exemplary process for an applications server for switching a multimode handset between a mobile and cordless telephone communications protocol.

FIG. 6 is a flow diagram of an exemplary process 600 for an applications server for switching a multimode handset between a mobile and cordless and cordless telephone communications protocol. The process of managing a multimode handset usage starts at step 602. At step 604, a call transfer signal of an ongoing telephone call is received to request transfer of the ongoing call between a first communications path using a mobile telephone communications protocol and a second communications path using a local, cordless telephone communications protocol. At step 606, a multimode handset is called via the first or second communications path over which the ongoing telephone call does not currently exist. At step 608, the multimode handset is connected with the ongoing telephone call via the first or second communications path over which the multimode handset was called. The process ends at step 610. The process may also include disconnecting the multimode handset from the first or second communications path from which the ongoing telephone call was switched. In addition, billing may be managed for a user of the multimode handset for using both a first and second communications path.

Figure 7:
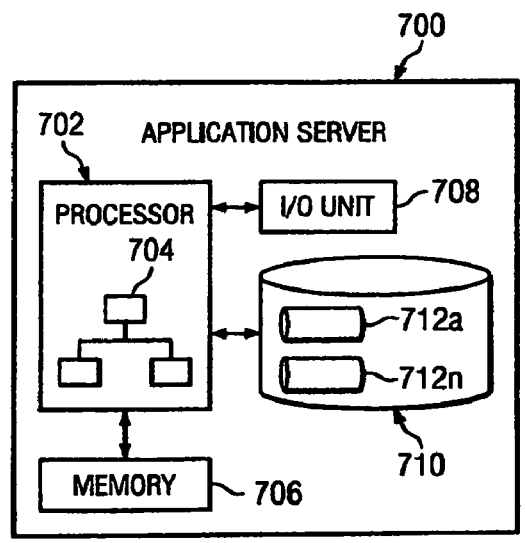
FIG. 7 is a block diagram of an exemplary application server configured to assist a multimode handset to switch between mobile and cordless telephone communications networks.

FIG. 7 is a block diagram of an exemplary application server configured to assist a multimode handset to switch between mobile and cordless telephone communications networks. The application server 700 includes a processor 702 that executes software 704. The processor 702 may be in communication with memory 706, input/output (I/O) unit 708, and storage unit 710. The storage unit may include one or more databases 712a-712n (collectively 712) that are used to store information associated with subscribers or any other aspect of enabling users of multimode handsets to communicate over mobile telephone communications paths and local, cordless telephone communications paths. The database 712 may include a list of local telephone numbers associated with each subscriber who pays for or utilizes the services of the multimode phone switching between the mobile telephone communications paths and the local, cordless telephone communications paths. By storing the local telephone numbers (e.g., home telephone numbers) and mobile telephone numbers, the application server 700 is able to call the user at his or her multimode handset via the home telephone number or mobile telephone number in response to receiving a call transfer signal during a telephone call. It should be understood that any other information associated with the user's account may be stored in the database as step 712.

TABLE I

Subscriber Phone Number Lookup Table

| Subscriber | Account Number | Mobile Telephone Number | Home Telephone Number |
| --- | --- | --- | --- |
| Robert Smith | A1234 | 555-123-4567 | 555-405-6997 |
| Paul Littleman | 7B281 | 555-643-1276 | 555-769-0298 |
| Susan Francis | 9JT31 | 555-202-3294 | 555-202-3332 |

TABLE I is an exemplary listing of telephone numbers associated with subscribers for use in providing switching of telephone communications modes as described with regard to FIGS. 3 and 4. In operation, the application server receives a call transfer signal from a multimode handset, looks up the telephone number that the multimode handset is using for the call (e.g., 555-643-1276), looks up the associated telephone number to call (e.g., 555-769-0298), and calls that telephone number to switch the call from the mobile communications path to the cordless communications path.

In addition to the application server 700 managing communications for the users when entering and exiting a home proximity zone (i.e., within the range of a base unit of a home cordless telephone), the application server 700 may additionally manage network usage monitoring and fees associated with a subscriber switching between a mobile telephone communications path and a cordless telephone communications path. For example, the application server 700 may store dates and times of day at which a users multimode handset switches from one protocol to another in the databases 712. Billing charges for providing such switching services may be managed by the software 704 of the application server 700. It should be understood that such account management may be provided by off-the-shelf software or custom design software for handling such functionality. The application server 700 may also be in communication with servers of service providers for which a user receives telecommunications services (e.g., mobile, phone services and home, local and long distance telephone services). The software 704 of the application server 700 may receive and/or communicate information to the different servers of the telecommunications service providers for managing operations of the multimode handset switching between different communications protocols. As previously described, the application server may track communications of subscribers who use the switching services between mobile communications and cordless communications so that any requests by the multimode handset may be immediately received by the application server 700 and acted on within a certain period of time (e.g., 600 milliseconds). The application server 700 may provide different and/or other functionality for providing the switching services as described herein.

Cordless phones often have ranges that vary not only among manufacturers, but also among models of cordless telephones produced by the same manufacturer. This variation should be addressed in order to allow for multimode phones to function properly with various cordless telephone base units. One way to address the variations of the ranges of the cordless phones is by using a method of establishing at least one signal parameter, such as a signal strength threshold, to determine when to switch between communications protocols.

FIG. 8 is a graphical depiction 800 of dropout points of different tested cordless telephones. A dropout point is a point in time or distance at which a test unit or cordless handset is communicating with a cordless telephone base unit and a signal parameter drops below a certain level (e.g., signal strength drops below a power threshold level 0 dBm or bit error rate increases above a certain threshold level). By determining the dropout points (or signal thresholds) of various models, a common threshold level can be determined that is used for establishing when to initiate a change in the communications protocol that is currently being used. The various cordless phone dropout points 804a, 804b, 804c, 804d, and 804e are depicted along signal curve 802. The signal curve 802 tracks signal power at various distances where the cordless phone dropout points occur. Each of the cordless phone dropout points represents the signal parameter at which the different test cordless phones had a signal parameter deteriorate across a threshold level or dropped their signal and effectively become disconnected from a cordless phone base unit. To determine the dropout points 804a-804e, TIA/EIA-signal measurement standard may be used for consistency purposes. Alternative signal measurement techniques may be used.

By using the dropout data, a signal strength threshold may be determined based on the shortest range 804a, for example, to ensure that a transition between communications protocols by a multimode phone occurs before the failure of the connection. It is to be understood that while signal strength may be used, any other measurable signal parameter, such as bit error rate or signal quality, may also be used for determining a signal parameter threshold level. Signal parameter threshold levels 804a' and 804a" define a range R around the first dropout point 804a may also be used in the determination of signal parameter threshold levels to establish as transition points for switching between communications protocols. For example, when moving away from a base unit the transition point for a multimode handset to switch communications protocols from cordless to wireless communications protocol may be established using signal parameter threshold level 804a'. In one embodiment, signal parameter threshold level 804a' may be 10 percent higher than the dropout point 804a to ensure that the cordless communications signal does not drop before switching a call to the wireless communications protocol. For moving towards the base unit the transition point may be established by using signal parameter threshold level 804a" to transition from the wireless to the cordless communications protocol. Alternatively, signal threshold level 804a' may be used for both signal parameter threshold levels to cause a multimode phone to transition between communications protocols in both directions. Establishing the signal threshold level may help to ensure that transition of communications protocols will not take place before the wireless communications link is established and before the cordless communications link is lost.

FIG. 9 is an illustration of an exemplary environment 900 for testing cordless telephones to determine a signal strength threshold for use in a multimode handset 914. Multiple cordless telephones 906a-906n (collectively 906) may be used for determining the shortest communication range of the cordless telephones 906. Cordless telephones 906 often vary between models even within the same manufacturer, as previously described. By testing the cordless telephones 906 with a wireless test unit 908 using the TIA/EIA-470-C standard, one or more signal parameter threshold levels associated with the shortest communication range of the cordless telephones 906 may be determined and established by storing in memory the multimode handset 914 for use in transitioning the multimode handset 914 between communications protocols. In performing a signal parameter test, the wireless test unit 908 may be configured to communicate with each base unit of the cordless phones 906 independently. A signal parameter or multiple signal parameters may be measured from a communications test signal 912 communicated between the wireless test unit 908 and base units of the cordless telephones 906. The wireless test unit 908 may be configured to determine when each communications test signal 912 crosses a threshold level. As before, the threshold may be based on signal quality, signal strength or any other relevant measurable signal attribute. The threshold may represent a time or distance when communications would deteriorate or no longer occur between a multimode handset 914 and a cordless base unit 906.

The signal parameters collected by the wireless test unit 908 may be entered into a collections component 902 to store at least one signal parameter measured by the wireless test unit 908. A collection component 902 may be any device capable of storing, sorting, and/or comparing numbers (e.g., signal strength). In one embodiment, the collection component is a computer executing software, such as a spreadsheet program 904, for assisting with and/or calculating a signal parameter threshold level. Measured signal parameters may be manually or automatically be entered into the collections component 902. In one embodiment, a network 910, which may be wireless, wired, or any other type of communications network capable of communicating data between the wireless test unit 908 and the collections component 902, for the wireless test unit 908 to communicate test data to the collections component 902. The collections component 902 may use test data measured by the wireless test unit 908 and compute or determine the signal parameter threshold level in the same or similar method as described in FIG. 8.

An initialization component 916, which may be hardware or software executing in the multimode handset 902, may be used to initialize the multimode handset 914 with the signal parameter threshold level derived from test data collected by the collection component 902. In one embodiment, the initialization component 916 is a software module that stores the signal parameter threshold level in memory for operation. Although shown as part of the multimode handset 914, the initialization component 916 may be an external component used to program the multimode handset 914. The initialization component 916 may store the signal parameter threshold level in a component of the multimode handset 914 at a component level (e.g., in memory prior to installation in the multimode handset 914) or after the multimode handset is completely configured. The signal parameter threshold level may be stored in memory of the multimode handset, as described with regard to FIG. 2. The signal parameter threshold level may then be used by the multimode handset 914 to switch between communications protocols in response to the multimode handset 914 having an operating communications signal with a signal parameter that crossed the signal parameter threshold level when communicating with a base unit of a cordless telephone. The operating communications signal should be understood as being distinct from the test communications signal used during the testing of the cordless telephones. In other words, the operating communications signal may represent the actual signal used while in communications mode by a user rather than a communications signal used during test mode to determine the signal parameter threshold level. The signal parameter threshold level may be defined as a predetermined percentage around or offset from a dropout point determined when testing one cordless telephone, as described in FIG. 8. Alternatively, the signal parameter threshold level may be defined by a signal parameter at a dropout point.

Figure 10:
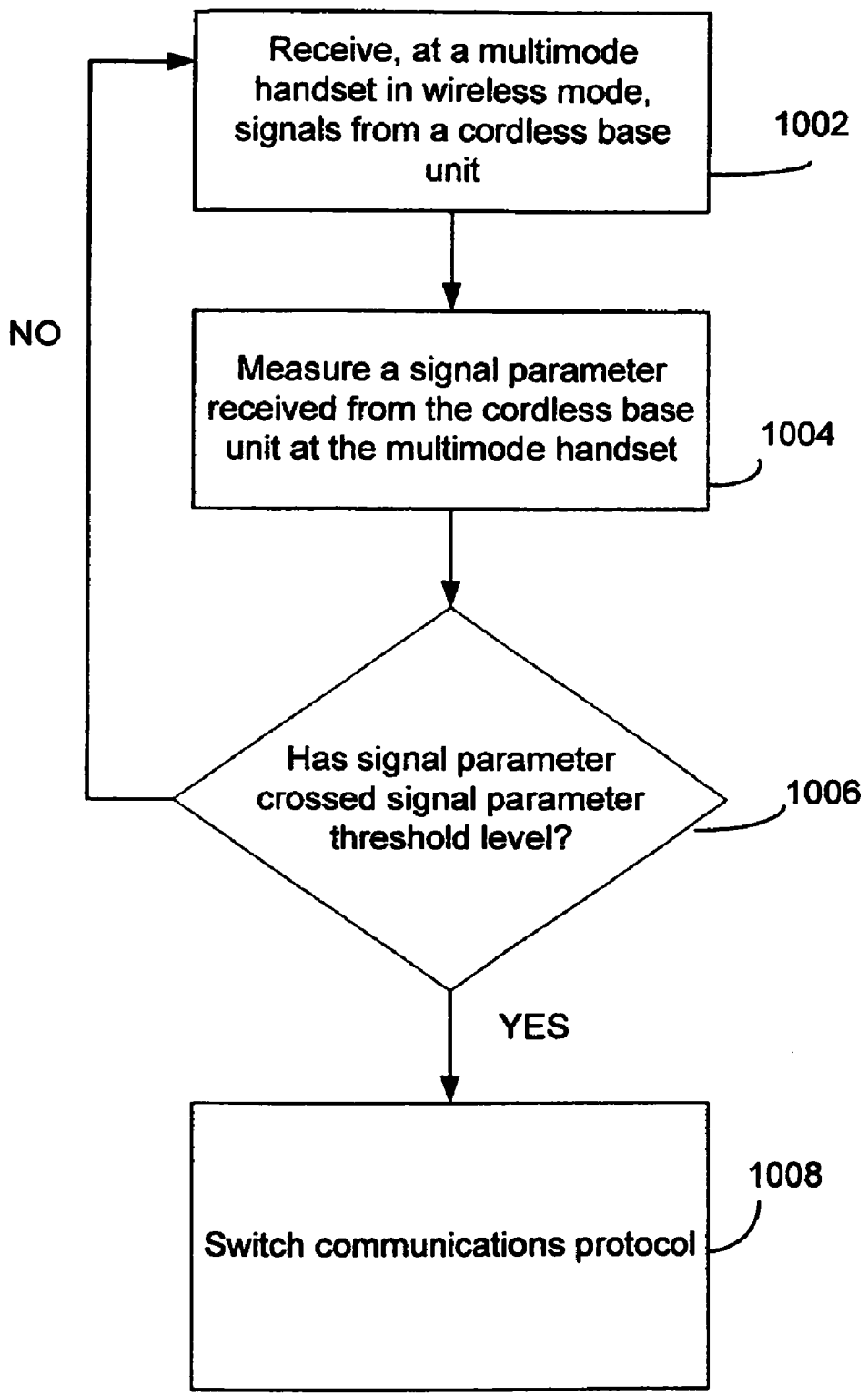
FIG. 10 is a flow diagram of an exemplary method for determining when to send a signal to request a change in communications protocols between wireless mode and cordless mode.

FIG. 10 is a flow diagram of an exemplary method 1000 for determining when to send a signal to request a change in communications protocol between wireless mode and cordless mode. At step 1002, a multimode handset currently operating in wireless mode receives signals from a cordless base unit. The multimode handset may then measure a signal parameter received from the cordless base unit at step 1004. It is to be understood that the signal parameter can be signal strength, signal quality, or any other parameter that can be measured related to the signals received from a cordless base unit. At step 1006, a determination may be made as to whether the signal parameter measured by the multimode handset based on a communications signal from the cordless base unit crosses a signal parameter threshold level. The multimode handset may use a processor to compare the measured signal parameter with a signal parameter threshold level stored in memory, where the signal parameter threshold level may be established as described with regard to FIGS. 8 and 9 and stored in memory during manufacturing of the multimode telephone, as understood in the art. If the signal parameter received from the cordless base unit has not crossed the signal parameter threshold level, the signal parameter is measured again in step 1004. The process may be the same or similar for the multimode handset entering or exiting range of the cordless base unit. In one embodiment, the signal parameter threshold level is the same for entering and exiting communication range of the cordless telephone base unit. Alternatively, multiple signal parameter threshold levels may be used, where one is used for entering and one exiting the communication range of the cordless telephone base unit.

Figure 11:
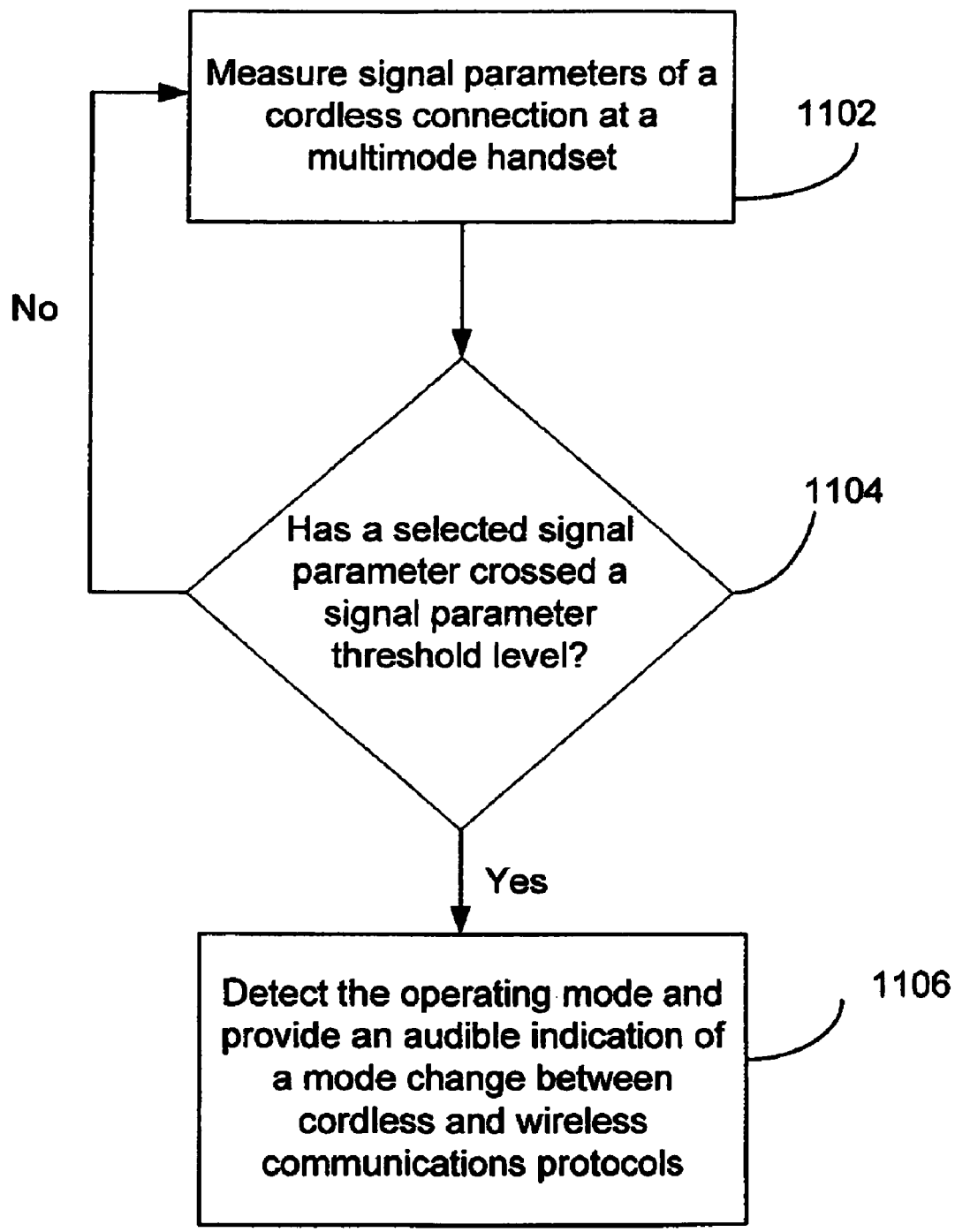
FIG. 11 is a flow diagram of an exemplary method for providing an audible indication of a mode change between communications protocols by a multimode handset.

FIG. 11 is a flow diagram of an exemplary method for a multimode handset providing an audible indication of a mode change between cordless and wireless modes or communications protocols. Whether in the cordless or wireless mode, the multimode handset may continuously monitor a communications signal being received from the cordless telephone base unit. When a mode change occurs, a user may be notified by an audible signal, such as a tone or multiple tones. The tone may be in any form, but is preferably different from currently used tones, such as the CPE Alert Signal (CAS) tone used for call waiting indication or Call Forwarding (CF) tone, as are commonly understood in the art. In step 1102, signal parameters of a cordless connection are measured at the multimode handset. A determination may be made if a selected parameter has crossed a signal parameter threshold at step 1104. In step 1106, the operating mode is detected and an audible indication of an operating mode change between cordless and wireless communications protocols is generated. In one embodiment, the audible indicator is substantially the same duration as the amount of time that it takes to switch communications protocols so that the user is less aware of a discontinuity in the communication. For multimode phones that are capable of operating in other communications modes, the audible indication for switching modes may work the same or similar as described with regard to the two modes described in FIG. 11.

Figure 12:
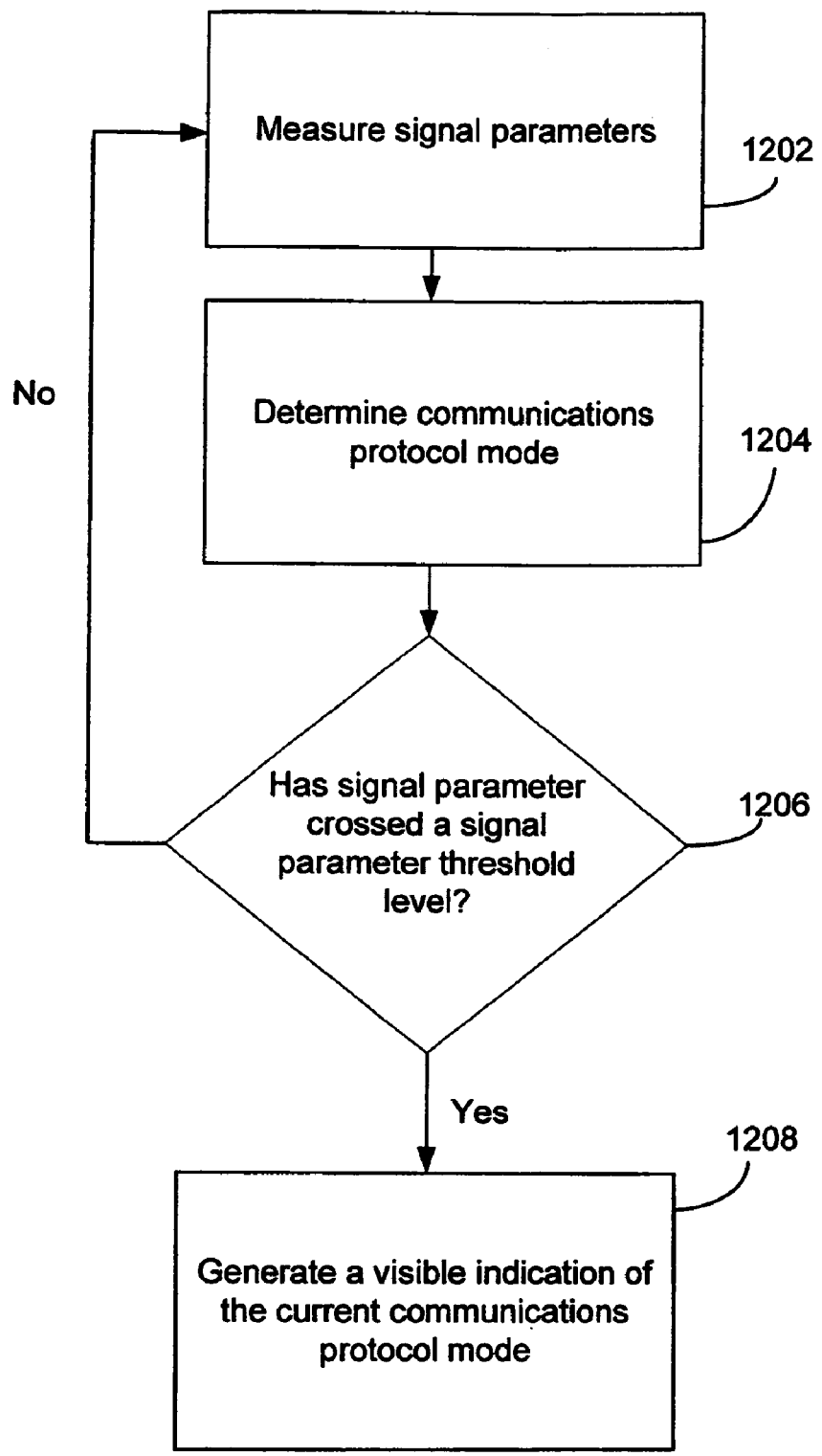
FIG. 12 is a flow diagram of an exemplary method for providing a visible indication of a change between communications protocols by a multimode handset.

FIG. 12 is a flow diagram of an exemplary method for providing a visible indication of a current communications protocol mode as well an operations mode change between cordless and wireless. As previously described, a multimode handset may continuously monitor a communications signal from a cordless telephone base unit. A visible indication may be presented that is representative of a current communications protocol mode. The visible indication may also represent a change in the current mode. The visible indication may be in the form of an LED displayed on the multimode handset, a light, an icon displayed on a screen located on the multimode handset, or any other visible indication capable of representing the current communications mode or a change in the current communications mode. In step 1202, signal parameters of a cordless connection are measured at the multimode handset. The communications protocol mode may be determined at step 1204. It should be understood that steps 1202 and 1204 may occur in reverse order without changing the principles of the present invention. In step 1206, a determination may be made if a selected parameter has crossed a signal parameter threshold. If the signal parameter threshold level has not been crossed by the measured signal parameter, then the process returns to step 1202. If the signal parameter threshold level has been crossed by the measured signal parameter, then in step 1208, a visible indication of the current communications protocol mode may be generated and displayed by lighting an appropriate LED, displaying an appropriate icon, or generating some other visual indication as described above.

Figure 13:
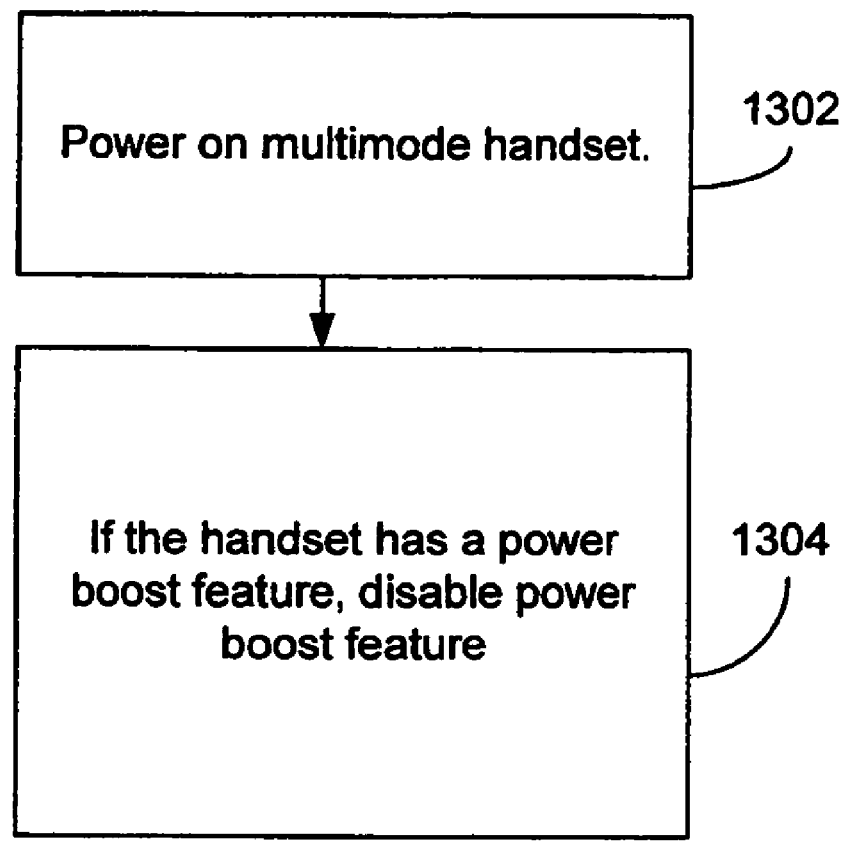
FIG. 13 is a flow diagram of a method for a disabling power boost option on a multimode handset.

FIG. 13 is a flow diagram of a method 1300 for disabling a power boost option on a multimode handset. Cordless telephones often have a power boost option, whereby a low signal or out-of-range condition for normal power is detected and transmitted power is boosted by a preset amount. This power boost option enhances the range of the cordless telephone, but is likely to interfere with the operation of the multimode handset while communicating in non-cordless communications protocols. One way to avoid the potential conflict is to disable the power boost feature. In step 1302, the multi-mode handset is powered on. If the handset has a power boost feature, the power boost option may be disabled or otherwise turned off (e.g., temporarily) in 1302. Disabling the power boost option may be performed automatically by the multimode handset using any number of methods or may be manually performed by a user. It should be understood that if the multimode handset has a power boost option for the wireless communications protocol, that power boost option may be disabled in response to detecting a cordless communications signal.

Figure 14:
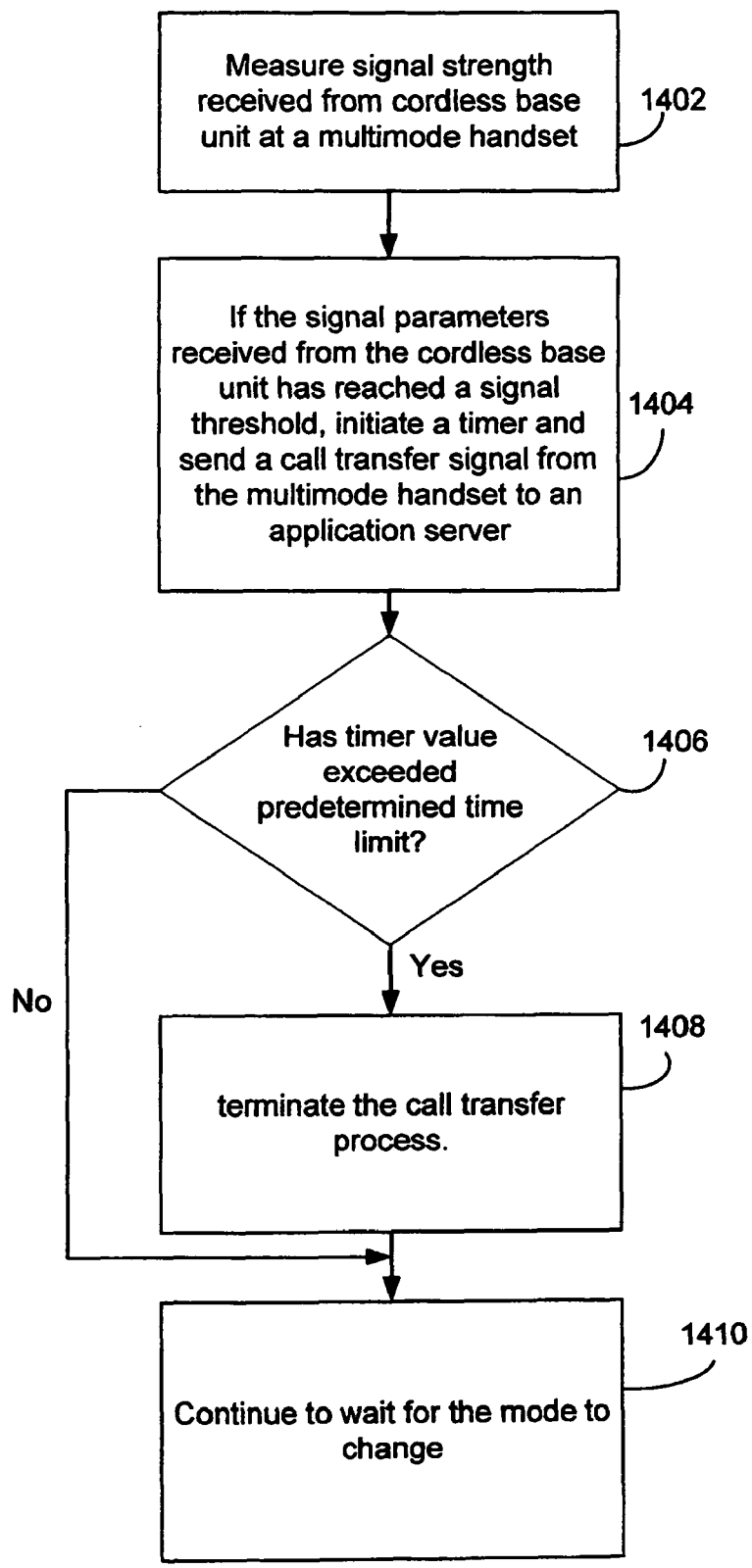
FIG. 14 is a flow diagram of a method for providing a call transfer time-out by a multimode handset.

FIG. 14 describes a method 1400 for providing a call transfer time out for use in accordance with the principles of the present invention. When a call transfer is initiated, the transfer may take some amount of time to occur as there may be conditions when network elements may not be able to make the change happen within a predetermined amount of time. Therefore, implementing a timer within a multimode handset may be useful to operate as a timeout indicator. In step 1402, one or more signal parameters of a communications signal received from the cordless telephone base unit are measured at a multimode handset. If the signal parameters have reached a signal parameter threshold, a timer is initiated and a call transfer signal is sent from the handset to an application server in step 1404. In step 1406, a determination may be made as to whether a timer value has exceeded a predefined time limit while waiting for mode change to complete. If the timer value has exceeded the predetermined time limit, an indication may be provided that the call transfer time has been exceeded and the call transfer process may be terminated in step 1408. The indication may be any type of audio or visual notification. If the predetermined time limit has not been exceeded, then in step 1410, the method continues to wait for the mode to change and repeats the check again.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A method of establishing a signal parameter threshold to switch between communications protocol by a multimode handset, said method comprising:

providing a plurality of cordless telephones of different models;

determining a dropout point at which a communications signal of each of the cordless telephones deteriorates below a predetermined level;

measuring at least one signal parameter value of the communications signal at the determined dropout point of each of the cordless telephones;

collecting the at least one signal parameter value of the cordless telephones;

identifying a cordless telephone model out of the plurality of cordless telephones of different models having a shortest range at which the associated dropout point is determined;

determining the at least one signal parameter value associated with the cordless telephone model having the shortest range; and establishing a multimode cordless handset with the at least one signal parameter value, the multimode cordless handset switching communications protocols during a call in response to the multimode handset crossing a signal parameter threshold level defined by the determined at least one signal parameter value of the cordless telephone model having the shortest range, wherein the switching of communications protocols during the call is facilitated by an application server.

2. The method according to claim 1, wherein measuring the at least one signal parameter value includes measuring signal strength.

3. The method according to claim 1, wherein measuring the at least one signal parameter value is performed by using signal measurement standards recommended in TIA/EIA-470-C.

4. The method according to claim 1, further comprising generating an audible indicator when switching between communications protocols.

5. The method according to claim 4, wherein generating the audible indicator is for a duration approximately the same as the time for switching communications between communications protocols.

6. The method according to claim 1, further comprising disabling a signal power boost option while operating in a cordless communications protocol mode.

7. The method according to claim 1, further comprising generating a visible indicator representative of which communications protocol is currently being utilized.

8. The method according to claim 1, further comprising:
    initiating a call transfer timeout signal when a time from issuance of a call transfer signal to actual transfer has exceeded a predetermined time period; and
    canceling switching between the communications protocols in response to receiving the call transfer timeout signal.

9. A system for testing cordless telephones to determine a signal strength threshold to switch between communications protocol by a multimode handset, said system comprising:
    a plurality of cordless telephones for use in determining shortest communication range for each of the cordless telephones;
    a wireless test unit configured to communicate with each of the cordless telephones and measure at least one signal parameter value of a test communications signal being communicated with each of the cordless telephones, said wireless test unit configured to determine when each test communications signal drops below a threshold level;
    a collection component configured to collect the at least one signal parameter value measured by said wireless test unit;
    an initialization component configured to initialize a multimode handset with a signal parameter threshold level value determined from the at least one signal parameter associated with an identified cordless telephone having a shortest communication range out of all the communication ranges of each of the cordless telephones collected by said collection component; and
    an application server configured to switch the multimode handset a first communications protocols to a second communications protocol in response to the multimode handset having an operating communications signal crossing the signal parameter threshold level when communicating with a base unit of the multimode handset.

10. The system according to claim 9, wherein the at least one signal parameter value measured by the collection component is a signal strength value.

11. The system according to claim 9, wherein the wireless test unit utilizes measurement standards recommended in TIA/EIA-470-C in measuring the at least one signal parameter value.

12. The system according to claim 9, further comprising an audio unit configured to generate an audible indicator when switching between communications protocols.

13. The system according to claim 12, wherein the audio unit is further configured to generate the audible indicator for a duration approximately the same as the time for switching communications between communications protocols.

14. The system according to claim 9, further comprising a component configured to disable a signal power boost option while operating in a cordless communications protocol mode.

15. The system according to claim 9, further comprising a visual unit configured to generate a visible indicator representative of which communications protocol is currently being utilized.

16. The system according to claim 9, further comprising a processing unit configured to initiate a call transfer timeout signal when a time from issuance of a call transfer signal to actual transfer has exceeded a predetermined time period, and to cancel switching between the communications protocols in response to receiving the call transfer timeout signal.

\* \* \* \* \*